(12) United States Patent
Boshears et al.

(10) Patent No.: US 10,343,075 B2
(45) Date of Patent: Jul. 9, 2019

(54) BUBBLE LOGIC FOR RIDE VEHICLE CONTROL

(71) Applicant: Oceaneering International, Inc., Houston, TX (US)

(72) Inventors: Michael Wayne Boshears, Orlando, FL (US); Lauren Marie Etta, Orlando, FL (US)

(73) Assignee: Oceaneering International, Inc., Houston, TX (US)

( * ) Notice: Subject to any disclaimer, the term of this patent is extended or adjusted under 35 U.S.C. 154(b) by 320 days.

(21) Appl. No.: 15/061,356

(22) Filed: Mar. 4, 2016

(65) Prior Publication Data

US 2016/0259332 A1  Sep. 8, 2016

Related U.S. Application Data

(63) Continuation of application No. 62/129,725, filed on Mar. 6, 2015.

(51) Int. Cl.
  *A63G 7/00* (2006.01)
  *G05D 1/02* (2006.01)
  *B61L 25/02* (2006.01)

(52) U.S. Cl.
  CPC .............. *A63G 7/00* (2013.01); *B61L 25/025* (2013.01); *G05D 1/0289* (2013.01); *G05D 2201/0212* (2013.01)

(58) Field of Classification Search
  CPC ...... A63G 7/00; B61L 25/025; G05D 1/0289; G05D 2201/0212
  See application file for complete search history.

(56) References Cited

U.S. PATENT DOCUMENTS

| | | | | |
|---|---|---|---|---|
| 2003/0148698 A1* | 8/2003 | Koenig | ................. | A63H 18/16 446/15 |
| 2008/0189003 A1* | 8/2008 | Gillula | ................. | G05D 1/028 701/24 |
| 2010/0268466 A1* | 10/2010 | Amutham | ............... | B61L 23/00 701/301 |
| 2010/0295943 A1* | 11/2010 | Cha | ......................... | G01S 13/82 348/143 |
| 2011/0006912 A1* | 1/2011 | Sheardown | ............. | B61L 23/06 340/901 |
| 2012/0000739 A1* | 1/2012 | Nogi | ........................ | B60L 9/08 191/50 |
| 2014/0277691 A1* | 9/2014 | Jacobus | ............... | G06Q 10/087 700/216 |
| 2015/0012157 A1* | 1/2015 | Nemeth | ................. | B61B 13/00 701/19 |
| 2015/0046078 A1* | 2/2015 | Biess | ..................... | G08G 1/166 701/301 |
| 2015/0060608 A1* | 3/2015 | Carlson | .................. | B61L 3/125 246/122 R |

* cited by examiner

*Primary Examiner* — Sze-Hon Kong
(74) *Attorney, Agent, or Firm* — Maze IP Law, P.C.

(57) ABSTRACT

A ride control system uses logic to define and track a virtual space, or bubble, in real time around a plurality of ride vehicle deployed along a predefined vehicle path to operate each independently of, and safely with respect to, the other ride vehicle deployed along the same predefined vehicle path at substantially the same time.

11 Claims, 2 Drawing Sheets

BUBBLE LOGIC FOR RIDE VEHICLE CONTROL

RELATION TO PRIOR APPLICATIONS

This application claims the benefit of, and priority through, U.S. Provisional Application 62/129,725, titled "Bubble Logic for Ride Vehicle Control," filed Mar. 6, 2015.

BACKGROUND

Dark ride vehicle systems have typically relied on "zone logic" type systems, where position around the track is defined by a zone area. The system knows which zones are occupied by vehicles but not where in the zone the vehicle is. Spacing the vehicle so that an empty zone is between each vehicle ultimately helps ensure that the ride vehicles do not collide with each other.

The zone logic approach is effective, but ultimately results in inefficient design of a dark ride vehicle system. Considerable effort is required to ensure that the zones are properly placed along the ride vehicle path, and final installation and programming may be inhibited due to the zone definitions. In addition, operation of the attraction containing the dark ride vehicle systems is inefficient due to the limitations of the zone logic approach. For example, the precise location of the ride vehicles is not known with a zone logic system, so the control system must take into account a large variance of position, thus limiting the error and recovery modes available for safe operation.

Although discussed below in terms of a dark ride system, the invention is equally applicable to other instances of multiple computer controlled vehicles on a path, such as with driverless automobiles or the like.

FIGURES

Various figures are included herein which illustrate aspects of embodiments of the disclosed inventions.

DESCRIPTION OF EXEMPLARY EMBODIMENTS

Figure 1:
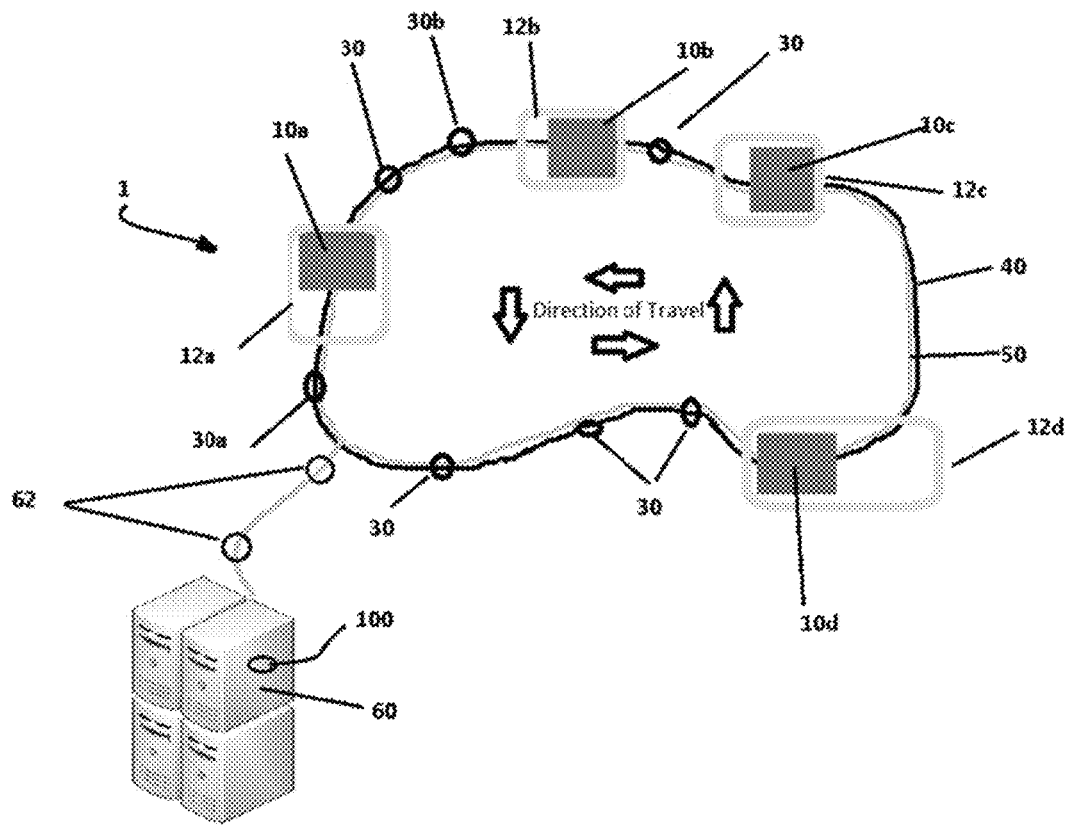
FIG. 1 is a block schematic diagram of an exemplary ride control system.

Referring to FIG. 1, ride control system 1, a dynamic and finite system for sensing a position of one or more ride vehicles 10 (e.g., 10a-10d), comprises a plurality of vehicle path sensors 30 (e.g. 30a-30d) deployed about predefined vehicle path 40, each vehicle path sensor 30a-30d of the plurality of vehicle path sensors 30 comprising a unique position identifier; control system 60; data communication system 50 deployed proximate predefined vehicle path 40 and operative to transmit data at a predetermined rate of speed to control system 60; and software 100 operatively resident in control system 60.

Predefined vehicle path 40 comprises a tracked vehicle path, a non-tracked vehicle path, or a combination thereof.

In an embodiment, data communication system 50 comprises a high data rate communication system which may further comprise a leaky coaxial communication system. In most embodiments, the data rate should be sufficient to overcome any lag inherent in transmitting data, processing the data, and sending one or more commands as necessary to each ride vehicle 10 to achieve the desired safety distances 12 (e.g., 12a-12d).

In preferred embodiments control system 60 is disposed proximate predefined vehicle path 40 but does not need to be, e.g. it can be remotely situated from predefined vehicle path 40. In certain embodiments, a data communication system 50 comprises a set of transceivers 62, which can be wired or wireless, to allow data communication between ride vehicles 10, one or more portions of data communication system 50, and control system 60. Although not illustrated in FIG. 1, it will be understood by those of ordinary skill in the data communication and ride vehicle arts that one or more transceivers 62 may be located on one or more, e.g. each, ride vehicles 10.

Although illustrated as being spaced at certain intervals, the actual spacing of vehicle path sensors 30 about and/or along predefined vehicle path 40 is a function of the control desired for each ride vehicle 10, e.g. in part it is a function of desired speed and/or spin and/or other characteristics such as pause/wait time along predefined vehicle path 40. Further, in various embodiments, vehicle path sensor 30 may comprise a passive sensor, a magnetic encoded strip, an acoustic positioning operator station (APOS) sensor, or the like, or a combination thereof. Further, the unique position identifier typically further comprises a predefined set of spatial coordinates related to a current position of its associated vehicle path sensor 30 with respect to predefined vehicle path 40. This unique position identifier can comprise X-Y coordinates, data produced by a gyroscopic incremental encoder, or the like, or a combination thereof.

Figure 2:
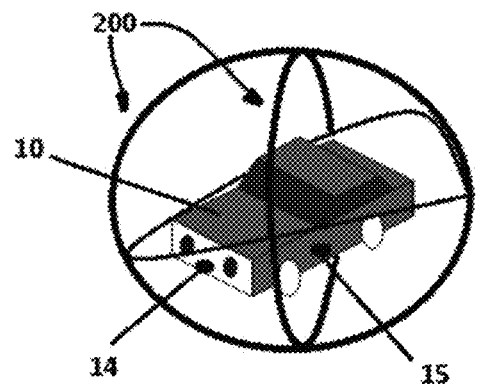
FIG. 2 is a diagram of an exemplary ride control system virtual space.

In an embodiment, vehicle sensor detectors 14 (FIG. 2) may be used to interact with vehicle path sensors 30 and relay information such as the unique position identifier to control system 60 via data communication system 50 or ride vehicle communication system 15 (FIG. 2). In a first embodiment, these vehicle sensor detectors 14 comprise active detectors triggered by vehicle path detectors 30, and relay information such as the unique position identifier to control system 60 via data communication system 50. In other embodiments, vehicle sensor detectors 14 comprise one or more triggers operative to trigger active vehicle path sensor 30 when ride vehicle 10 passes near or over vehicle path sensor 30 and vehicle path sensors 30 relay information such as the unique position identifier to control system 60 via data communication system 50. In either embodiment, vehicle communication system 15, which may comprise a transceiver, and/or separate transceivers 62 may be used to relay the data.

Software 100, typically resident in control system 60, comprises various software modules, as will be familiar to those of ordinary skill in the computer programming art. Typically, software 100 comprises deterministic location software 101, deterministic spatial software 102, and vehicle control software 103 which are interoperably related. These are not specifically illustrated in the figures as one of ordinary skill in programming arts can understand these modules without the need of illustration.

Typically, deterministic location software 101 comprises one or more deterministic algorithms able to determine a current location of each ride vehicle 10 of a set of ride vehicles 10 currently deployed along predefined vehicle path 40 using the unique position identifiers of the plurality of vehicle path sensors.

Typically, deterministic spatial software 102 comprises one or more deterministic algorithms able to create a dynamic set of spatial coordinates describing virtual space 200 (FIG. 2) around each ride vehicle 10 in real time. Virtual space 200, which conceptually can describe a two or three dimensional bubble, comprises data defining a two or three dimensional set of spatial coordinates in which each ride vehicle 10 can operate at or below a predetermined probability of physical contact with another ride vehicle 10 of the set of ride vehicles 10.

Typically, vehicle control software 103 comprises one or more deterministic algorithms able to adjust a predetermined set of physical characteristics of each ride vehicle 10 based on the dynamic set of spatial coordinates and the determined current location of each ride vehicle 10 of the plurality of ride vehicles 10 along vehicle path 40, preferably in real time. The predetermined set of physical characteristics can include speed relative to predetermined vehicle path 40, orientation relative to predetermined vehicle path 40 and/or one or more other ride vehicles 10, spin rate of a specific ride vehicle 10, other ride vehicle 10 characteristics such as yaw, pitch, and roll, or the like, or a combination thereof.

Figure 3:
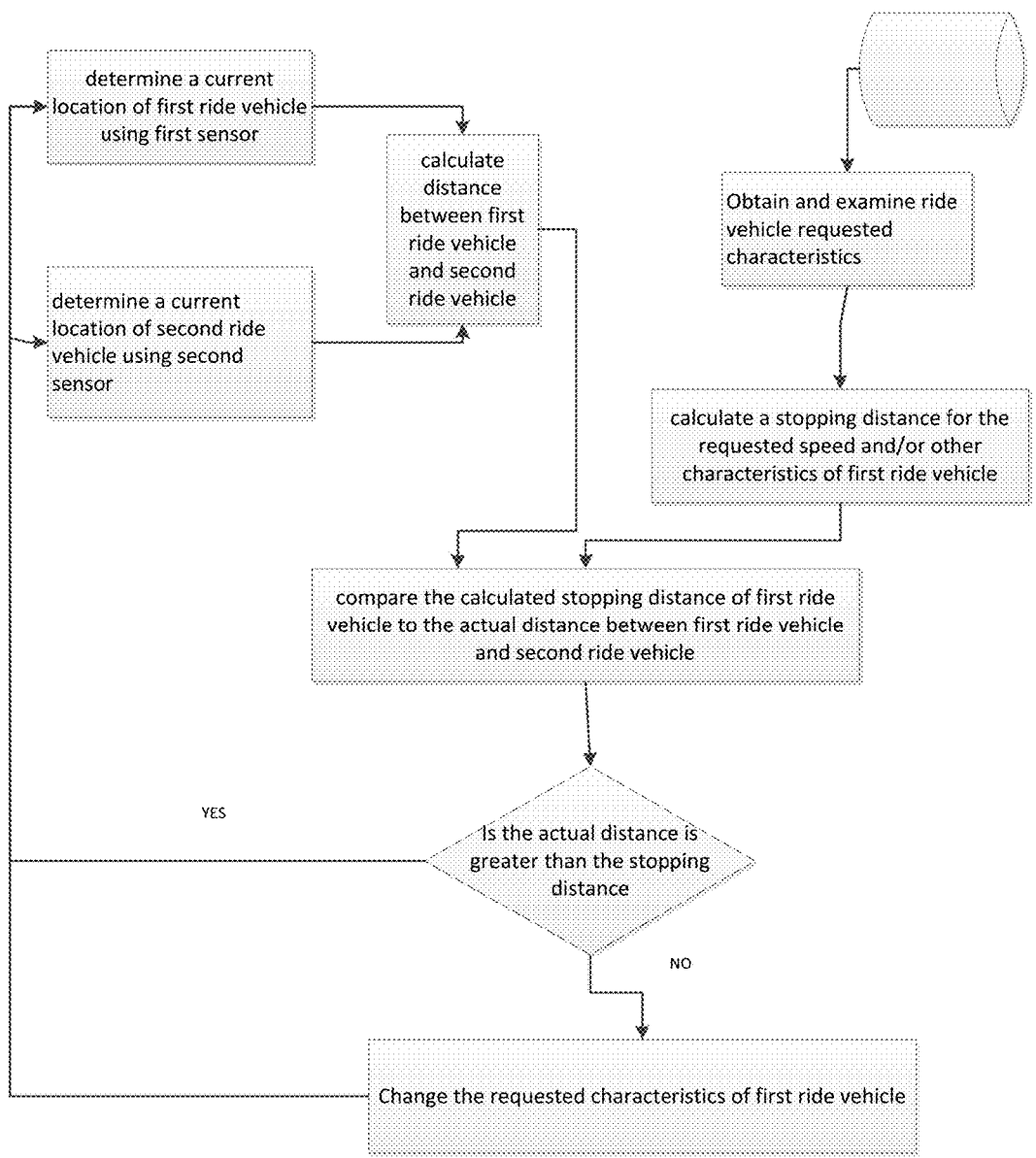
FIG. 3 is a flowchart of an exemplary ride control system method.

In the operation of exemplary embodiments, referring generally to FIG. 1 and FIG. 3, in general software 100, through a series of algorithms, determines the exact location of one or more ride vehicles 10 along predetermined vehicle path 40 in real time and creates a model of dynamic "bubble" virtual space 200 around each ride vehicle 10 which indicates a two or three dimensional space 12 in which each such ride vehicle 10 can operate safely without the probability of physical contact with other ride vehicles 10. This dynamic bubble's shape changes based, in part, on the speed at which ride vehicles 10 move along ride vehicle path 40 and, by way of example and not limitation, may be indicative of a worst-case collision scenario.

In an exemplary embodiment, first ride vehicle 10a, deployed along predefined vehicle path 40, is allowed to operate independently of second ride vehicle 10b deployed along the same predefined vehicle path 40 at substantially the same time by determining a current location of first ride vehicle 10 as deployed along predefined vehicle path 40, e.g. a real time position, by using first vehicle path sensor 30a of a predetermined set of vehicle path sensors 30 deployed about predefined vehicle path 40. A current location of second ride vehicle 10b, also deployed along predefined vehicle path 40 at substantially the same time as first ride vehicle 10a, is determined by deterministic location software 101 using second vehicle path sensor 30b of the predetermined set of vehicle path sensors 30 deployed about predefined vehicle path 40. As described above, each of these vehicle path sensors 30, e.g. 30a-30d, comprises a unique position identifier associated with a predetermined spatial set of coordinates along predefined vehicle path 40. Deterministic spatial software 101, using one or more deterministic algorithms, is typically used to create a dynamic set of spatial coordinates describing virtual space 200 (FIG. 2) around each ride vehicle 10 in real time, where virtual space 200 is as described above. As also noted above, the predetermined set of ride vehicle physical characteristics comprises a model of an outer boundary of each ride vehicle 10. Moreover, virtual space 200 may further be a function of the speed at which one or more ride vehicles 10a-10d is then currently moving along predefined vehicle path 40.

Based on the predetermined set of ride vehicle physical characteristics, a set of spatial coordinates is calculated, typically using deterministic spatial software 102, which describe virtual space 200 around first ride vehicle 10a and second ride vehicle 10b, in real time, within which first ride vehicle 10a can operate without the probability of physical contact with second ride vehicle 10b. A current set of spatial coordinates is also calculated for first ride vehicle 10a and second ride vehicle 10b with respect to predefined vehicle path 40 in real time, typically using deterministic spatial software 102.

A first requested set of ride vehicle directives for first ride vehicle 10a is obtained from a data source, e.g. a database or other data file (FIG. 3). As used herein, "directives" comprise commands and/or data and the like which can effect one or more changes in behavior of each ride vehicle 10 such as by commanding ride vehicle controller 16 to perform a function. By way of example and not limitation, this first requested set of ride vehicle directives can include a currently desired speed with respect to predefined vehicle path 40, a currently desired orientation with respect to predefined vehicle path 40, or the like, or a combination thereof. Based on the first requested set of ride vehicle directives for first ride vehicle 10a, a current stopping distance is calculated for first ride vehicle 10a and/or second ride vehicle 10b with respect to predefined vehicle path 40 in real time. This can be calculated using vehicle control software 103 or other software operatively interoperable with vehicle control software 103.

With the current calculated set of spatial coordinates for first ride vehicle 10a and second ride vehicle 10b, the calculated current stopping distance of either or both first ride vehicle 10a and/or second ride vehicle 10b is compared to the calculated spatial coordinates of first ride vehicle 10a and second ride vehicle 10b with respect to predefined vehicle path 40 in real time. This is typically accomplished using vehicle control software 103. If the currently determined current distance between first ride vehicle 10a and second ride vehicle 10b with respect to predefined vehicle path 40 is greater than the calculated stopping distance, no change is typically made to the set of ride vehicle directives for first ride vehicle 10a or the set of ride vehicle directives for second ride vehicle 10b by software 100.

However, if the currently determined current distance between first ride vehicle 10a and second ride vehicle 10b with respect to predefined vehicle path 40 is less than the stopping distance, vehicle control software 103 changes or otherwise creates either or both of the set of ride vehicle directives for first ride vehicle 10a and second ride vehicle 10b to place first ride vehicle 10a and second ride vehicle 10b at a distance within which first ride vehicle 10a can operate without the probability of physical contact with second ride vehicle 10b. Changing either or both of the set of ride vehicle directives for first ride vehicle 10a and second ride vehicle 10b may comprise decreasing or increasing the speed of either or both of first ride vehicle 10a and second ride vehicle 10b relative to and/or along to predefined vehicle path 40.

It will be understood by those of ordinary skill in the programming arts that all these calculations and determinations are not limited to just first ride vehicle 10a and second ride vehicle 10b but may also extend or be extended to take other ride vehicles, e.g. third ride vehicle 10c and/or fourth ride vehicle 10d, into account.

In these various embodiments, the predetermined rate of speed may be a high rate of data, e.g. a baud rate of 1 MB or higher, e.g. 1 gigabyte. A leaky coaxial communication system may be used, where data are transmitted at a high rate of speed back to a land based control system, e.g. control system 60, which, as described above, may be housed or otherwise located proximate to or away from predefined vehicle path 40.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A ride control system, comprising:
   a. a plurality of vehicle path sensors deployed at a predetermined location about a predefined vehicle path, each vehicle path sensor of the plurality of vehicle path sensors comprising a unique position identifier;
   b. a plurality of ride vehicles deployable about the predefined vehicle path, each ride vehicle comprising a ride vehicle controller, a ride vehicle communication system, and a ride vehicle detector configured to be interoperative with the plurality of vehicle path sensors;
   c. a data communication system deployed proximate the predefined vehicle path, the data communication system operatively in communication with the plurality of vehicle path sensors and with the plurality of ride vehicles;
   d. a control system operatively in communication with the data communication system, with the plurality of vehicle path sensors, and with the plurality of ride vehicles deployed about the predefined vehicle path; and
   e. software operatively resident in the control system, the software comprising:
      i. deterministic location software, comprising a deterministic algorithm able to determine a current location of each ride vehicle of the plurality of ride vehicles currently deployed along the predefined vehicle path using the unique position identifiers of the plurality of vehicle path sensors;
      ii. deterministic spatial software, comprising a deterministic algorithm able to create a dynamic set of spatial coordinates describing a virtual space in real time around each ride vehicle of the plurality of ride vehicles, the virtual space defining a three-dimensional set of spatial coordinates in real-time, based in part on the speed at which each ride vehicle is currently moving along the predefined ride vehicle path, where each ride vehicle of the plurality of ride vehicles is configured to operate at or below a predetermined probability of physical contact with another ride vehicle of the plurality of ride vehicles; and
      iii. vehicle control software, comprising a deterministic algorithm operative to:
         a. adjust a plurality of physical characteristics from a predetermined set of physical characteristics of each ride vehicle of the plurality of ride vehicle based on the dynamic set of spatial coordinates and the determined current location of each ride vehicle of the plurality of ride vehicle; and
         b. issue a command to change either or both of (a) a set of ride vehicle directives related to the plurality of physical characteristics for a first ride vehicle of the plurality of ride vehicles and (b) a set of ride vehicle directives related to the plurality physical characteristics for a second ride vehicle of the plurality of ride vehicles to place the first ride vehicle and the second ride vehicle at a distance within which the first ride vehicle can operate without the probability of physical contact with the second ride vehicle.

2. The ride control system of claim 1, wherein the ride vehicle communication system comprises a transceiver.

3. The ride control system of claim 1, wherein:
   a. the vehicle path sensor comprises an active sensor; and
   b. the ride vehicle detector comprises a passive ride trigger operative to trigger the active sensor.

4. The ride control system of claim 1, wherein:
   a. the ride vehicle detector comprises an active sensor;
   b. the vehicle path sensor comprises a passive sensor operative to trigger the active sensor.

5. The ride control system of claim 4, wherein the passive sensor comprises a magnetically encoded strip.

6. The ride control system of claim 1, wherein the vehicle path sensor comprises an acoustic positioning operator station (APOS) sensor.

7. The ride control system of claim 1, wherein the data communication system comprises a high data rate communication system.

8. The ride control system of claim 1, wherein the data communication system comprises a leaky coaxial communication system.

9. The ride control system of claim 1, wherein the predefined vehicle path comprises a tracked vehicle path, a non-tracked vehicle path, or a combination thereof.

10. The ride control system of claim 1, wherein the unique position identifier further comprises a predefined set of spatial coordinates related to a current position of the vehicle path sensor with respect to the predefined vehicle path.

11. The ride control system of claim 1, wherein the control system is disposed proximate the predefined vehicle path.

* * * * *